Oct. 15, 1957    J. WINSON    2,809,377
METHOD OF MANUFACTURE OF MITTEN
Original Filed Aug. 27, 1956    6 Sheets-Sheet 1
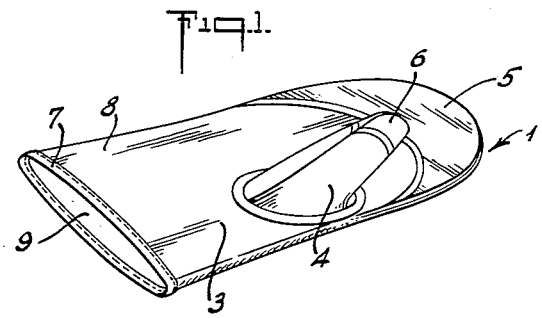
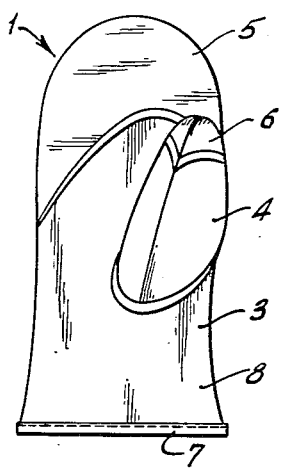 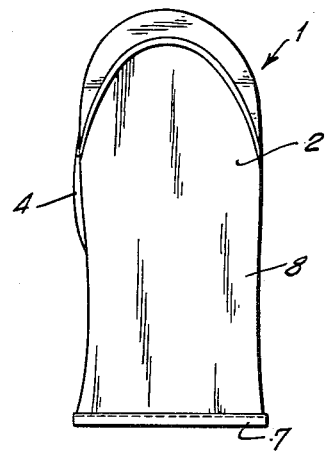
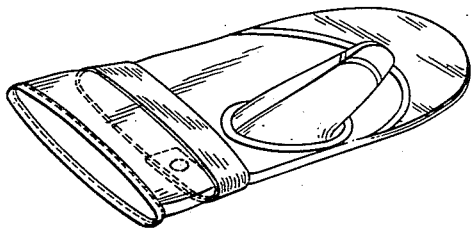 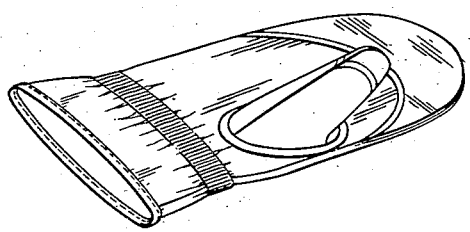
INVENTOR
JONATHAN WINSON
BY Edward V. Connors
ATTORNEY

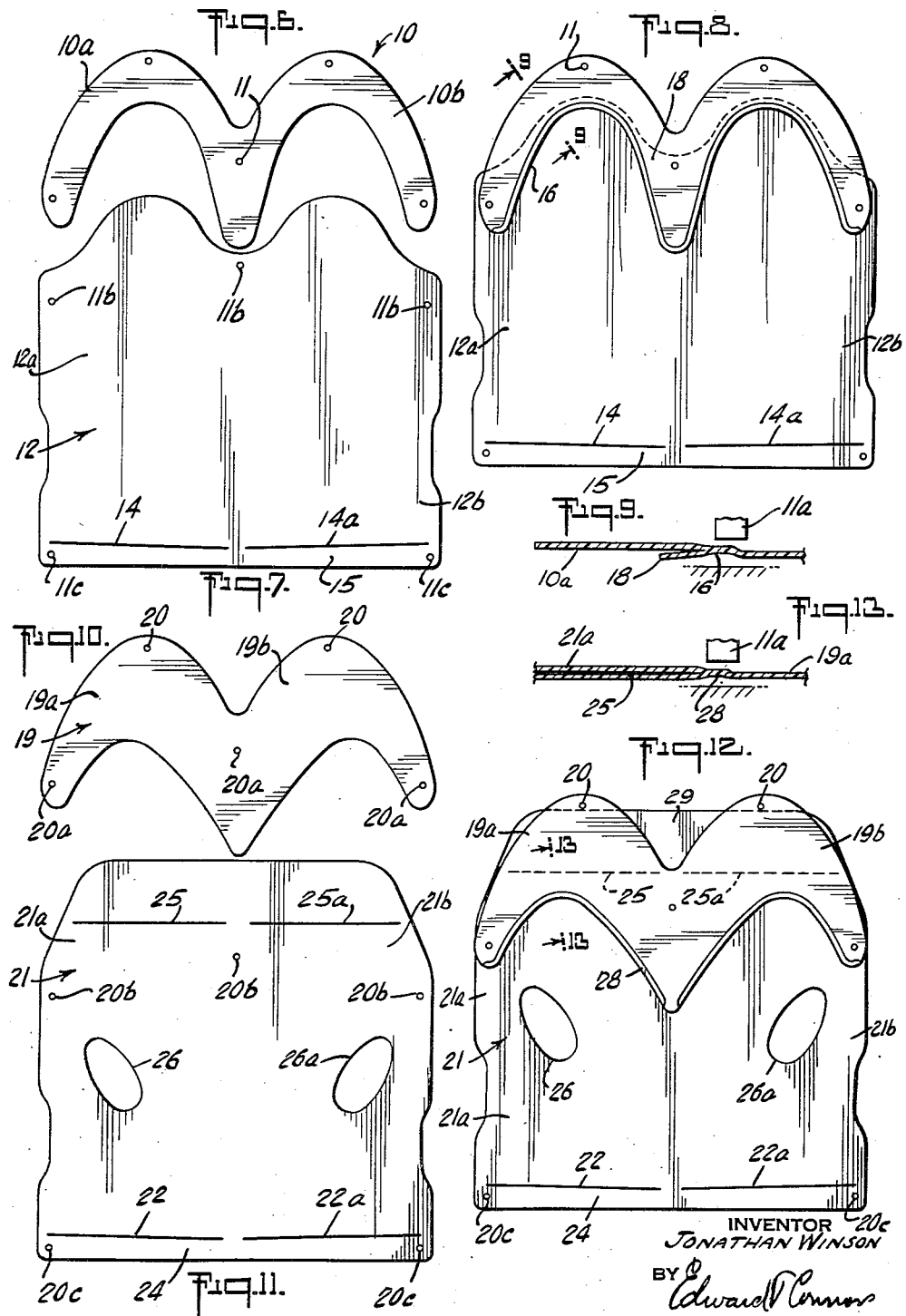

Oct. 15, 1957 J. WINSON 2,809,377
METHOD OF MANUFACTURE OF MITTEN
Original Filed Aug. 27, 1956 6 Sheets-Sheet 3
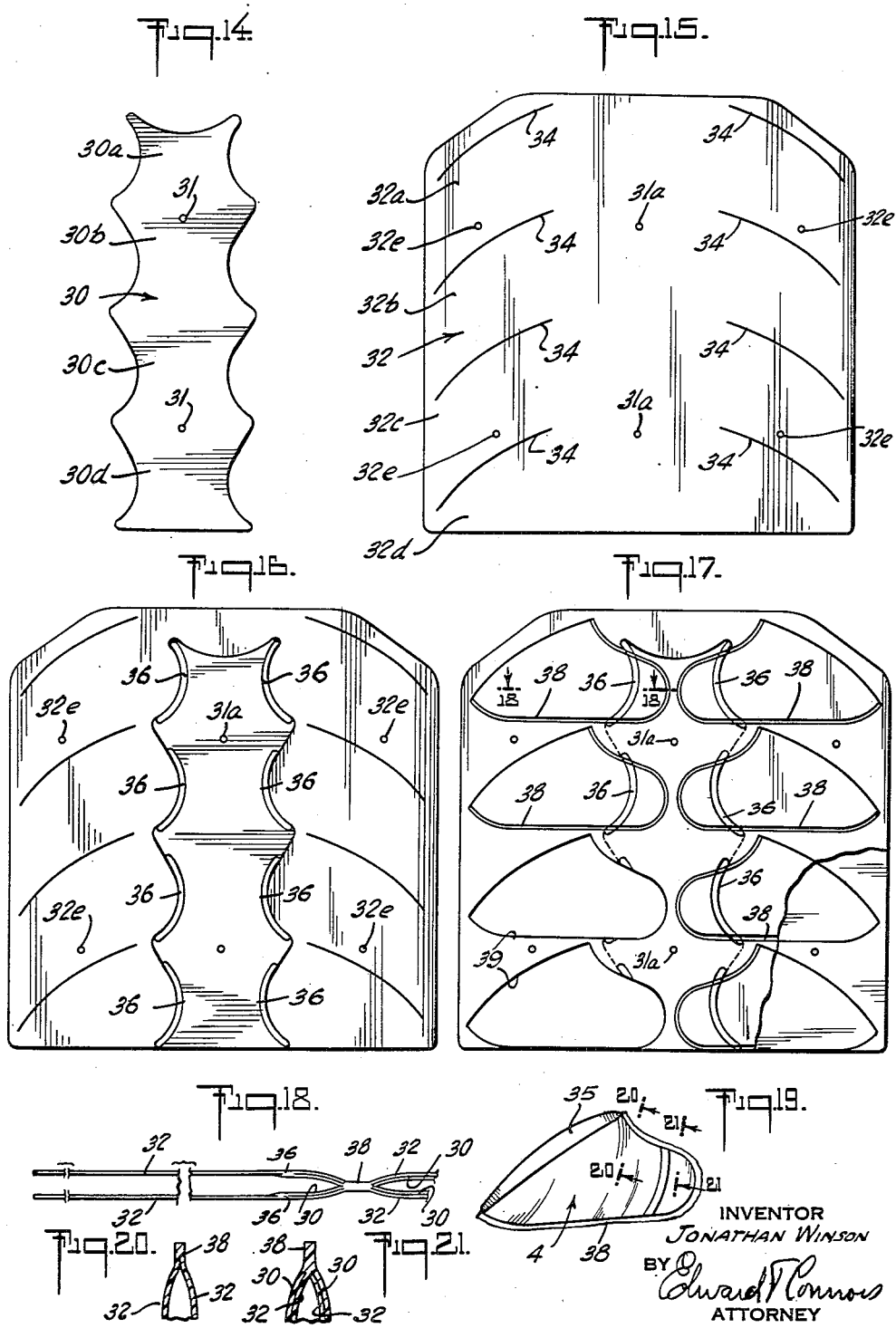
INVENTOR
JONATHAN WINSON
BY Edward Connors
ATTORNEY

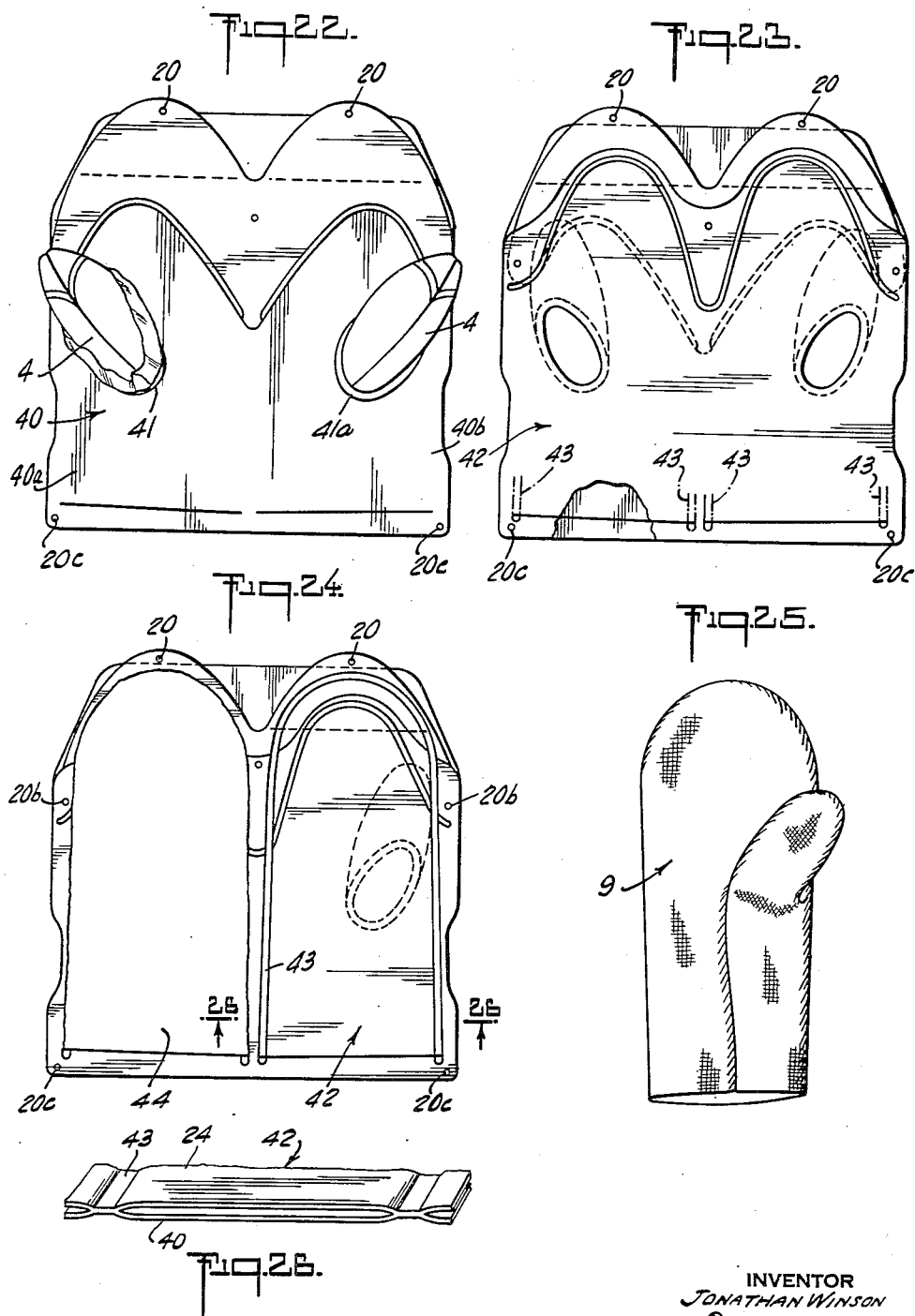

Oct. 15, 1957 J. WINSON 2,809,377
METHOD OF MANUFACTURE OF MITTEN
Original Filed Aug. 27, 1956 6 Sheets-Sheet 5
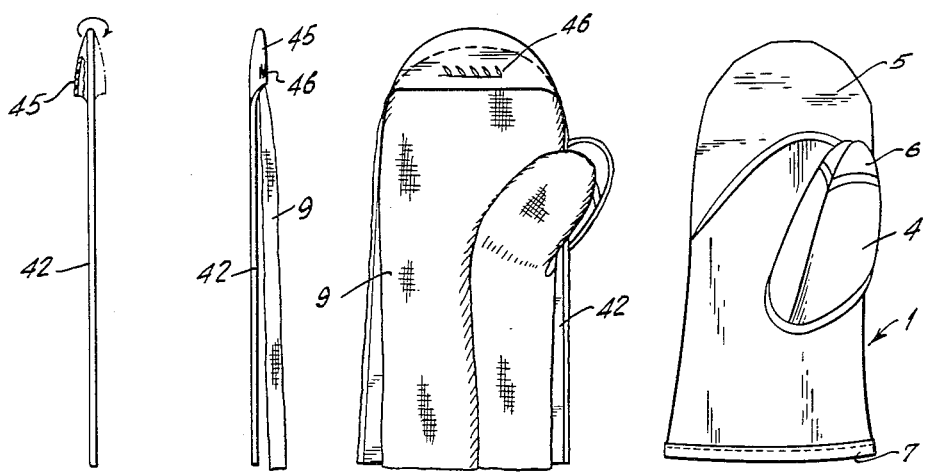
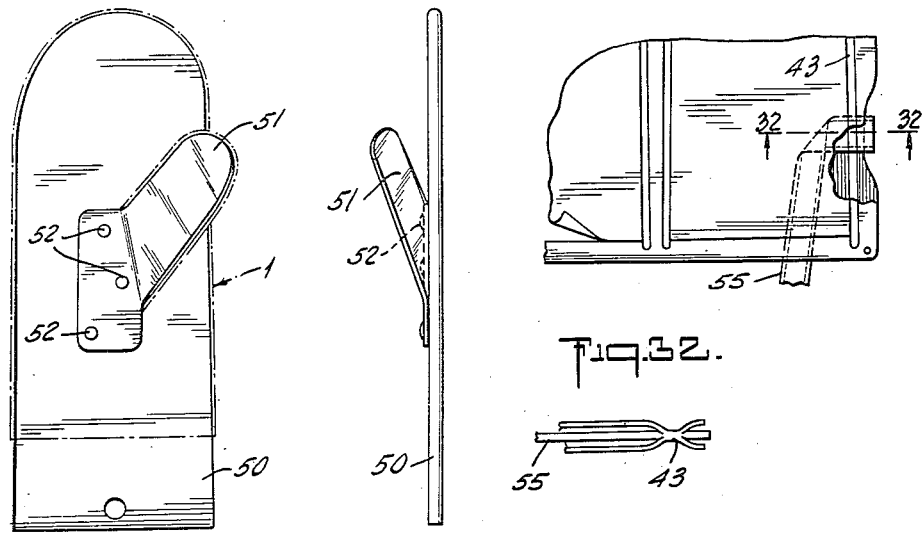
INVENTOR
JONATHAN WINSON
BY
ATTORNEY

United States Patent Office 2,809,377
Patented Oct. 15, 1957

2,809,377

METHOD OF MANUFACTURE OF MITTEN

Jonathan Winson, New York, N. Y., assignor to Air Baby, Inc., New York, N. Y., a corporation of New York Original application August 27, 1956, Serial No. 606,417, now Patent No. 2,782,421, dated February 26, 1957. Divided and this application October 8, 1956, Serial No. 614,752

3 Claims. (Cl. 2—169)

This application is a division of my copending application, Serial No. 606,417, filed August 27, 1956, now Patent No. 2,782,421, dated February 26, 1957.

The present invention relates to mittens and particularly to a method of manufacture of a mitten having a heat sealed waterproof covering over an insulating liner.

A flexible waterproof plastic material is chosen for the outer covering and is heat sealed, rendering the cover completely waterproof. A vinyl chloride polymer plasticized sheeting properly formulated for low temperature flexibility is particularly suitable for the purpose, but other suitable materials may be used as will appear hereafter. For simplicity of explanation, throughout the specification and claims the term "vinyl" has been used to generically indicate a suitable sheeting material which may be readily heat-sealed.

The waterproof mittens in accordance with the invention are particularly designed for use by children and thus the low cost thereof is an important item. The construction is particularly suitable for fabrication by production machinery and unskilled labor.

The present invention is an improvement over the construction disclosed in my United States Patent No. 2,732,662, issued March 13, 1956.

Prior to the disclosure of the construction set out in my patent, no commercial embodiments were available for low cost waterproof mittens having a vinyl sheeting outer cover. In my patent I disclose a novel method of securing the outer vinyl member to the inner heat insulating liner. While the construction shown in my patent was generally successful in that the mittens received an enthusiastic reception by retail outlets and the public, about 150,000 pairs of mittens so fabricated having been sold in the first season, in use it has been found that many of the mittens had a comparatively short life because holes appeared in the fingertip region of the mittens. At first glance, the fault appeared to be an extensive tearing of the vinyl outer cover in the fingertip and thumb tip regions. It has been noted that the holes developed with much less wear of the mittens than normally would be expected in view of the good wear resistance of the vinyl thermoplastic outer covering.

The mitten is made of vinyl sheeting in order to provide a material which may be embossed, printed or otherwise treated to enhance its appearance. The embossing currently used makes the vinyl feel like fine nylon. Further, vinyl is the only material which may be electronically heat-sealed to provide the desired watertight seam. Still further, heat-sealing is less expensive than fabrication by sewing.

In order that the desired softness and pliability be achieved, the vinyl sheeting selected for the covering is of proper low temperature formulation and thickness. The appropriate gauge of the material ranges between .007 and .011 in thickness, .009 being preferable. It has been found that a gauge above .011 is not suitable because it is too stiff for comfort as well as uneconomical from the standpoint of material cost, while the use of a gauge below .007 gives rise to weak seams and a generally flimsy product.

The resistance to abrasion of a flat sheet of approximately .009 gauge vinyl against sandpaper, pavement or frozen ground is approximately equal to the abrasion resistance of poplin or like thickness. Since .009 poplin makes mittens of satisfactory wearing qualities, without further investigation, the development of holes in the vinyl mittens would appear to be surprising.

I have found that the holes in the vinyl covering have developed because of the formation of what I have termed "points" therein, the points being the same as that developed by the buckling of a tubular member. My explanation of the formation of the "points" depends upon certain characteristics of the vinyl covering as compared with the conventional coverings used heretofore. By reason of the reversed seam construction used in the fingertip region, the outer vinyl covering at this point has a semi-tubular cross-sectional shape. Upon grasping an object, the fingers of the hand tend to assume a curvature, the curvature being concave on the palm side of the hand. The curvature imposed by the hand on the mitten has the effect of buckling the semi-tubular cross-sectional shape of the vinyl covering producing sharp points on the palm side of the mitten. The formation of the points and their sharpness depends on the fact that the vinyl is elastic and on the nature of the buckling of the vinyl semi tube, as will be set forth in detail later.

Sharp points in vinyl are amazingly subject to wearing through. In fact, I have found that if a sharp point is formed in the vinyl mitten covering and the point is drawn across a surface no rougher than a piece of ordinary clothing material under normal pressure, a small hole will be formed in the vinyl.

In my opinion the heat generated by the frictional contact is an important factor in the formation of a hole at a sharp point, at least in some instances. Vinyl sheeting material is quite heat sensitive, losing its embossing if subjected to a temperature of about 180° F. (depending upon the temperatures used in calendering the material) for a short period of time. In the situation in which the minute area which exists at the tip of a sharp point is subjected to abrasion even under low pressure, it is clear that there is a great build-up of abrading pressure per square inch at the point itself, and very little friction is required to raise the temperature of the vinyl so that it is worn away.

The fact that the vinyl is stretched to considerable tension at the top of a point makes the formation of the hole that much easier.

Simple qualitative test I have made on vinyl sheeting serve to indicate that this is the phenomenon at work as will hereafter be described in further detail.

In practice when a child is wearing the mitten and performs the common act of picking up a snowball from frozen ground, precisely those conditions are present which my research shows will cause a hole to develop. The hand is cupped making points form in the thin mitten material. Although the temperature is low, the scraping against the frozen ground almost instaneously causes the point surface to acquire a decided temperature rise, similarly as a match may be lighted by frictional striking against frozen ground. The result, in practice, is the rapid development of holes, rendering the mitten no longer waterproof and consequently useless. Thus it is essential for the utility of the electronically sealed waterproof mitten that sharp points be eliminated from the mitten in use.

Considering the formation of points in more detail, it is well known in the theory of the buckling of thin walled tubes made of homogeneous elastic materials that under the application of sufficient bending moment the tube may fail in one of two modes, namely: by buckling of the "diamond" type or by buckling of the Brazier type. Diamond type buckling is typified by a crinkling of the tube into one or more dimples or diamonds, there being sharp points in the tube surface at the corners of the diamonds. Brazier type buckling is typified by a gradual flattening of the tube cross-section into a smooth oval. Even when the tube is bent double, if it has failed under Brazier type buckling, the tube radii formed at the edges of the transverse line along which the tube is bent are greater than those encountered in diamond type buckling.

For a tube of given diameter and material, the question of whether the tube will buckle in one manner or the other as the bending moment is gradually increased depends on the wall thickness of the tube. The bending moment required to buckle the tube, should the tube fail in the diamond type failure is given by the formula:

$$M_d = .6\pi \left( \frac{1 - L(R/t)^2}{1 + (.004 e_y)} \right) E R t^2$$

Where E is the modulus of elasticity, R is the tube radius, $t$ is the wall thickness, $e_y$ is the yield strain of the material, and L is a constant determined by the material of the tube.

The bending moment required to buckle a tube should the tube fail in Brazier buckling is given by the formula:

$$M_b = \pi \left( \frac{2\sqrt{2}}{9} \right) E R t^2$$

For a given tube, one can determine whether failure occurs in diamond or Brazier buckling by calculating $M_d$ and $M_b$. If $M_d$ is less than $M_b$, the tube will fail under diamond type buckling, and vice versa.

Calculations of this type carried out for the vinyl semi-tube formed by the mitten in its fingertip region indicate that below a vinyl thickness of .010 the mitten will crinkle into a sharp pointed diamond pattern when buckled by the hand, while above a thickness of .010 the semi tube will buckle under Brazier type buckling with substantially larger radii at the points. The calculation of thickness is not exact because of the various assumptions made in the theory, but the critical thickness can be expected to be approximately that calculated.

Using this knowledge, the present invention aims to overcome the difficulties and disadvantages of the prior construction by providing a composite construction wherein the fingertip region of the mitten is formed of a vinyl sufficiently thick to cause the semi tubular buckling, which is inevitable in use, to be of the Brazier type rather than of the diamond type. At the same time, the top of the mitten is made of a normal gauge vinyl maintaining the necessary flexibility, pliability and economy of manufacture.

The thicker material at the fingertip region allows an advantage which is very much greater than a linear advantage with thickness. This is primarily due to the fact that when the critical thickness is exceeded, buckling is of the Brazier type. The points formed then are of comparatively large radius. The pressure is distributed over a far wider area. This reduces the compression and the temperature rise under abrasive conditions. Secondly, the increased thickness allows a greater mass of vinyl for heat absorption, keeping the local temperature down. Thirdly, the linear effect of increased thickness exists, namely, the increased thickness presents more material which must be worn or melted through before a hole is formed.

These findings and the success of the present invention in use have been substantiated by a number of experiments and field tests which will be mentioned at a later point. The problem of the formation of points has not been met in the leather or poplin mitten field since these materials are not homogeneous and elastic and do not behave structurally in the manner of vinyl. Likewise, the problem has not been met in rubber mittens since elastic constants of rubber are such that failure is of the Brazier type even when the rubber is of low gauge.

Another object of the invention is to provide a novel and improved method of low cost mitten construction.

A further object of the invention is to provide a mitten construction which is simple and economical in manufacture and durable in use.

Other objects and advantages of the invention will be apparent from the following description and from the accompanying drawings which show, by way of example, embodiments of the invention.

In the drawings:

Figure 1 is a perspective view of an electronically sealed vinyl mitten in accordance with the invention.

Figure 2 is a plan view of the palm side of the mitten as shown in Figure 1.

Figure 3 is a plan view of the back of the mitten shown in Figure 1.

Figure 4 is a perspective view of a slightly modified form of the mitten shown in Figure 1.

Figure 5 is a perspective view of another modification of the mitten shown in Figure 1.

Figure 35:
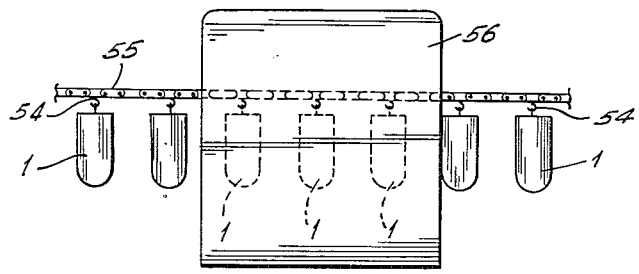

Figure 6 is a plan view of a pair of reinforcing members for the fingertip regions of the backs of the mitten as manufactured. (For facility of manufacture, some of the component parts of the mitten are die cut forming a plurality of component parts on one sheet. The drawings illustrate the shape of the component parts as manufactured; in some instances, two like parts being made on one sheet, and in other instances, more than two parts are die cut on one sheet.)

Figure 7 is a plan view of two back members of the mitten.

Figure 8 illustrates the position of the members shown Figures 6 and 7 when assembled to form a pair of completed backs.

Figure 9 is a section taken along the line 9—9 of Figure 8 and additionally showing a cross-section of a sealing electrode and back-up surface.

Figure 10 is a pair of fingertip reinforcing members for the palm side of the mittens.

Figure 11 is a pair of palm members for the mitten.

Figure 12 illustrates the assembly of the members shown in Figures 10 and 11.

Figure 13 is a cross-sectional view taken along the line 13—13 of Figure 12, and additionally showing a cross-section of a sealing electrode and back-up surface.

Figure 14 shows a reinforcing member for four pairs of thumb tip reinforcing members.

Figure 15 shows the blank for four pairs of thumb members.

Figure 16 shows the assembly of the parts shown in Figures 14 and 15.

Figure 17 shows the assembly of a pair of the assemblies shown in Figure 16.

Figure 18 is a sectional view taken along the line 18—18 of Figure 17.

Figure 19 illustrates an individual thumb member as would be torn away from the lower left hand side of Figure 17.

Figure 20 is a sectional view taken along the line 20—20 of Figure 19.

Figure 21 is a sectional view taken along the line 21—21 of Figure 19.

Figure 22 illustrates the blank of Figure 12 with two thumbs as shown in Figure 19 in position, the left hand thumb showing the selvedge resulting from the heat sealing operation in position while the right hand thumb is illustrated with the selvedge ripped away.

Figure 23 shows the assembly of Figure 22 reversed and attached to the underside of the assembly shown in Figure 8.

Figure 24 illustrates the assembly of Figure 23 with a completed mitten covering torn away from the surplus material.

Figure 25 is a plan view of the heat insulating inner member of the mitten.

Figure 26 is a diagrammatic cross-sectional view taken along the line 26—26 of Figure 24.

Figure 27 is a side view of the mitten torn away from the piece shown in Figure 24 and illustrating the cap member to receive the inner heat insulating member.

Figure 28 is a view corresponding to Figure 27 with the heat insulating member inserted in position in the cap member.

Figure 29 is a view corresponding to Figure 28 but with the partially assembled mitten turned so that the heat insulating member is facing the viewer, the figure showing the attaching means between the heat insulating member and its cap member.

Figure 30 is a view corresponding to Figure 29 but with the mitten cover member turned right side out and with a binding added.

Figure 31 is a fragmentary view of Figure 24 showing the strap insertion of the modification shown in Figure 4.

Figure 32 is a sectional view taken on the line 32—32 of Figure 31.

Figure 33 is a plan view of a mandrel for the completed mitten.

Figure 34 is a side view of the mandrel shown in Figure 33.

Figure 35 is a schematic view of a conveyor belt carrying mandrels with mittens thereon through an oven.

Figure 36:
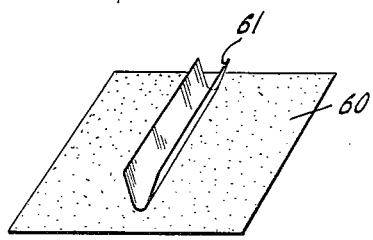

Figure 36 is a perspective view of a piece of vinyl sheeting bent into semi-tubular shape and positioned against an abrasive surface.

Figure 37:
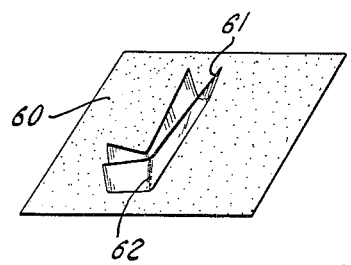
Figure 38:
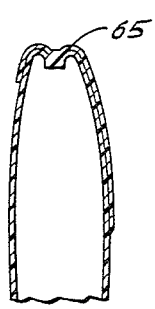

Figure 37 is a view corresponding to Figure 36 but with the sheeting of semi-tubular shape buckled into a sharp point of the diamond type, Figure 38 is a cross-sectional view of the fingertip region of the outer cover showing the semi-tubular formation at the tip end.

Figure 39:
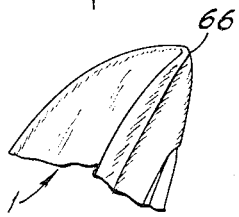

Figure 39 is a perspective view of the tip of a mitten being worn and showing an example of a point.

Referring to the drawings, there is shown a mitten 1 in accordance with the invention. The mitten includes a back member 2, a front or palm member 3, a thumb member 4 and fingertip portions 5 and 6. In order to provide a finished appearance to the mitten, a cuff seam member 7 may be provided. The completed outer cover for the mitten may be generally designated by the numeral 8, and an inner insulating member for the mitten may be generally designated by the numeral 9. The cover member 8 is formed of sheeting made of any suitable thermoplastic material of appropriate low temperature formulation and suitable thickness. Among the thermoplastic materials which may be used are vinyl chloride polymer plasticized sheeting, polyethylene sheeting, or impregnations of these basic materials into fabrics, or any other suitable material which may be heat-sealed and which is waterproof.

The gauge of the covering material 8 must be thin enough to provide the desired pliability for the completed mitten, and inasmuch as the mittens made in accordance with the invention are particularly suitable, because of their low cost, for small children, the gauge of the material need not be too heavy to withstand severe abrasion, it being more important that the mitten be pliable and comfortable for the child. I have found that a material from .004 to .015 may be used for the body of the mitten including the parts 3 and 4. It is preferable to use a gauge between .008 and .011, or about .009 for the body of the mitten as the heavier materials are so stiff as to be uncomfortable. The fingertip portions can be made from a material of a gauge between .010 and .030, preferably about .0145. Furthermore, the material should be selected with characteristics so as to be pliable under low temperature conditions such as may be experienced by children in the use of the mittens during winter weather.

By reason of the sale in the children's market, it is very important that the cost of the completed mitten be kept as low as possible not only because the children often lose or misplace their mittens, but because they are soon outgrown and discarded.

I have discovered a novel method of manufacture of the waterproof covering member which is very suitable for low cost production manufacture. I have found that the parts may be die cut from sheets of plastic material, suitable openings being simultaneously cut in the sheet material so that various assemblies may be made over pins maintaining the die cut parts in proper alignment for smooth sealing and in order that the electronic sealing device may apply the heat-sealed seam at the proper location without undue waste of scrap material. In accordance with my method of manufacture, the mitten is made of a vinyl assembly of front or palm portions and a back portion, the front portion having a thumb member installed in place.

Vinyl sheeting is readily sealed by the conventional electronic sealing means which includes a source of electricity including means to provide a comparatively high frequency thereto, the seam being accomplished between plates connected to opposite terminals of the electronic sealing machine in a manner well known to those skilled in the art.

The inner heat insulating member 9 (Figs. 1 and 25) may be made of any suitable material, such as wool, cotton, or the newer thermoplastic materials, and may be knitted or woven as desired. The inner member is formed and shaped according to conventional methods.

In the progressive preparation of the component parts of the mitten, reference may be had to Figures 6–31. In Figure 6 there is shown a fingertip reinforcing member blank 10 for the back of the mitten. This blank provides a pair of reinforcing members 10a and 10b, the pair being made at one time to facilitate manufacture. It should be noted that the particular blank 10 is provided with three holes 11 for use to align the assembly of the various parts as will later appear.

In Figure 7 there is shown a back member blank 12 including a pair of back portions 12a and 12b. Blank 12 is provided with three holes 11b to co-operate with the lower three holes 11 of blank 10. At the bottom of the blank 12 are provided slits 14 and 14a to facilitate tearing away the surplus material 15, in which are positioned the alignment holes 11c. The blanks 10 and 12 are then placed upon any suitable backing member having upwardly extending pins to align the holes 11 over the holes 11b as shown in Figure 8. A heat sealing operation is then performed defining the seal 16 securing the reinforcing fingertip members 10a and 10b over the back members 12a and 12b. This heat sealing operation is carried out by what I term the "lost material method" in which the heat sealing electrode (11a in Figure 9) extends over the edge of member 10 which is to be sealed. Thus in performing the seal 16, the edge of member 10 is blended into the material of the back sheet 12 avoiding the expensive finishing operation if selvedge of member 10 remained after sealing.

The successful application of the "lost material method" in practice is a delicate matter since precise alignment must be maintained between the member 10 and electrode 11a throughout the length of the seal 16. This means that the back-up member or tray from which the pins protrude which enter holes 11 must be in excellent alignment with electrode 11a. The alignment problem is made more difficult by the fact that efficient production requires the use of turntables on which four or six trays are mounted. The turntable revolves and stops in four or six positions, at each position one tray carrying parts 10 and 12 being aligned under the electrode. Further, efficient production requires that electrodes and trays be capable of being taken off and replaced on the heat sealing machines rapidly as sizes are changed.

I have found that an electrode width of ¼" corresponding to a seal on member 10 of ⅛" is suitable. I have also found that pins of the nature of die pins must be carried by the electrode assembly to fit into mating female members mounted on the trays. Since the mating pins and holes would provide electrical contact if both were conductors and this contact would short circuit the sealing process, I make the pins of steel and the mating holes of Plexiglas or other nonconductor.

A sectional view through the seam 16 is shown in Figure 9, the surplus material 18 being on what will be the outer edge of the inner surface and is not removed.

In Figures 10–13 there is shown a like assembly for the palm portion 3. Figure 10 illustrates a blank 19 for a pair of reinforcing members 19a and 19b, the pair being likewise made at one time to facilitate manufacture. It should be noted that the blank 19 is provided with two holes 20 and three holes 20a for alignment purposes.

In Figure 11 there is shown a palm member blank 21 including a pair of portions 21a and 21b. Blank 21 is provided with three holes 20b to co-operate with the lower three holes 20a of blank 19. At the bottom of the blank 21 are provided slits 22 and 22a to facilitate tearing away the surplus material 24, in which are positioned the alignment holes 20c, after the mitten has been completed. In the upper portion of the blank 21 are provided slits 25 and 25a to form a cap member as will later appear. Additionally, generally oval shaped thumb openings 26 and 26a are provided. The blanks 19 and 21 then are placed upon a suitable backing tray having upwardly extending pins to align the holes 20a over the holes 20b as shown in Figure 12. The heat sealing operation is then performed defining the seal 28 securing the reinforcing fingertip members 19a and 19b over the back members 21a and 21b. The lost material method is used again in this seal, 11a representing the electrode in Figure 13. The surplus material 29 is left in position.

In Figures 14–19 are shown the various blanks providing an assembly of thumb members 4. For convenience and economy of handling, it is preferable to make four pairs of thumb parts at the same time.

A thumb reinforcing tip blank 30 is shown in Figure 14, the blank including four thumb tip reinforcing members 30a and 30b, 30c and 30d. The blank 30 is provided with two alignment holes 31.

In Figure 15 there is shown a thumb blank 32 providing four pairs of thumb blanks 32a, 32b, 32c and 32d. Two alignment holes 31a are provided. The thumb blank 32 is formed with curved slits 34 which will form cut off end 35 of the completed thumb 4 shown in Figure 19. Additionally, positioning holes 32e are formed in the blank 32. As shown in Figure 16, the thumb tip reinforcing member is secured in position over the blank 32 by alignment of the holes 31 and 31a, and an electronic seal made as indicated at 36. In forming the completed thumbs, two blanks 32, as shown in Figure 16, are placed together so that the reinforcing tip blanks 30 are in contact and the openings 31a aligned over their respective pins as shown in Figure 17. A heat sealing operation is performed as indicated at 38 defining the outer edges of the thumb members 4.

Two of the completed thumb members 4 have been torn away, as indicated at 39 (Figure 17) from the remainder of the material which becomes scrap after the other completed thumb members have been removed therefrom. As may be seen in the cross-sectional view at Figure 18, the seam 38 at the thumb end tip is a four-ply seam of the parts 32 and 30. The completed thumb is shown in Figure 19 as torn away from the sealed assembly of the blanks 32 and 30 shown in Figure 17.

In Figures 20 and 21 are shown cross-sectional views of the thumb 4 edge seam. It should be noted that the reinforced tip portion extends only about the outer end or tip of the thumb 4, the more inward portion of the thumb 4 being of the thinner gauge material so as to provide the desired pliability.

A blank 40 for a pair of front or palm portions 40a and 40b is shown in Figure 22. It should be noted that the thumbs 4 have been placed in position. This operation is accomplished by placing a palm blank 21 on a suitable backing member having upwardly extending pins to align the holes 20 and 20c. A formed thumb 4, as shown in Figure 19, actually has two sides similar to the palm and back sections of the finger tip portion of the mitten, either or both of these sides may be reinforced. The formed thumb 19 is placed over a suitable mandrel and the backing member holding the blank 21 is apertured under the thumb hole openings 26 and 26a to receive the thumb 4 on its mandrel. A heat sealing operation is performed providing the seam 41 and 41a. At 41a the selvedge has been shown torn away providing a clean appearing surface to the mitten.

In Figure 23 there is shown a waterproof covering assembly 42 including a blank 12 assembled over a blank 40 ready for the sealing operation which is partially indicated in dotted lines at 43, and more clearly in Figures 24 and 26.

The outline remaining after a completed vinyl covering has been torn away from the surplus material is indicated at 44 (Figure 24).

In Figure 27 there is shown a side view of the vinyl covering as made in the reverse position. At the top thereof is a side view of a cap member 45 defined by separating the outer portion of the slit 25 or 25a.

In Figures 28 and 29 the liner member 9 is shown in position in the cam member and secured by "blind" stitching or other suitable means 46.

In Figure 30 the outer vinyl covering has been turned back over the liner 9 and the cuff seam 7 secured in position, finishing the mitten.

In Figure 31 there is shown a somewhat modified means of finishing the cuff in that a belt member 55 is shown as sealed in the seam 43, the seam being shown clearly in Figure 32.

Thus far described the manufacture of the mitten has been done inside out, that is, the heat sealing has been done on the outside of the parts, but while the parts are reversed from that of the completed mitten. When turned right side out, the sealed edges are inside of the mitten. For this reason the construction is termed a "reversed seam" construction as is usual in the trade.

In order to remove any wrinkles which may have formed in the mittens during manufacture or handling, and for otherwise dressing the mitten for final packing, a process of heating and cooling the mitten over a form is desirable. This may be done by placing the mitten over an internally heated form as is common in the industry, but I find that the following heat treatment is much more desirable.

The completed mitten 1 as shown in dotted lines in Figure 33 is placed over a mandrel 50 which may be made of a thin sheet of any suitable material providing the desired stiffness, such as Masonite or the like, the mandrel tip being given a curved edge to conform to the desired curvature of the fingertip region of the mitten.

Attached to the mandrel 50 is a thumb piece 51 secured by rivets 52 to the mandrel 50 or by any other suitable means. The thumb piece 51 likewise has its outer end curved to conform to the desired curvature of the mitten. As may be seen in Figure 34, the thumb piece 51 is turned outwardly simulating the normal position of the mitten, and the angle of the thumb piece 51 with respect to the mandrel 50 is such that the seam of the thumb is given a rounded curvature. The mitten 1 after being placed on the mandrel 50 is attached to hooks 54 of a conveyer belt system 55 which carries the formed mittens in place on their mandrels through an infra red or convection oven 56 for a heat treatment step wherein the mittens are subjected to temperature of about 120° F. for a period of about twenty seconds. The mittens are then allowed to cool to room temperature on the mandrel as it moves on the belt, after which they are removed therefrom and packed for sale.

In order to illustrate the difficulties overcome by my invention, I have included Figure 36 in which there is shown a rough surface 60 on which is positioned a piece of vinyl 61 curved in a trough-like shape and as such having a generally tubular cross-section in contact with the rough surface. When drawn along the rough surface in this shape, the vinyl presents a resistance to wear approximately equivalent to poplin. However, when the tubular member 61 is bent as indicated in Figure 37, forming a sharp point 62 equivalent to one of the diamond type, and the same pressure is applied to the tubular member, only a very short stroke is needed to wear a hole through the point 62. I have found that if the tubular member 61 is drawn slowly across the roughened surface, the effects of the abrasion are different than if the tubular member 61 is moved rapidly across the surface, indicating that in the case of the fast movement heat plays an important part in softening the point so that it is abraded more readily.

This illustrates the cause of holes in the mittens of prior construction. My composite construction as shown in section at Figure 38 illustrates the large radius of the semi-tubular tip 65 buckled in Brazier type buckling. While buckling may still occur in my construction as shown in Figure 39, it is of the Brazier type and the surface 66 exposed to friction is many times the area of the point of previous construction. This completely changes the nature of the phenomena by which the holes were developed in the prior construction, as has been described above. I have proved my improved construction in comparative service field tests in which the conditions were so severe that all of the mittens of prior construction failed, yet none of the improved construction developed holes or showed signs of such development, thus proving a non-linear relationship between radius of the contact surface and the development of holes.

While the invention has been described and illustrated with reference to a specific embodiment thereof, it will be understood that other embodiments may be resorted to without departing from the invention. For example, while the mitten has been described and illustrated as having both the front and the back sides of the thumb and finger portions formed of a thickness so that the buckling is of the Brazier type, it is obvious that perhaps a cheaper construction might be made by reinforcing only one of the two sides, that is, by reinforcing either the front or the back, but not reinforcing both sides. Therefore, the form of the invention set out above should be considered as illustrative and not as limiting the scope of the following claims.

I claim:

1. The method of making a heat sealed waterproof vinyl mitten having a reversed seam which comprises transversely slitting a palm side in the finger tip end, heat sealing a finger tip portion to the finger tip end of the slitted palm side, then heat sealing front and back sides thereby providing a formed mitten with an internal cap, and turning the formed mitten inside out.

2. The method of making a heat sealed waterproof vinyl mitten having a reversed seam which comprises transversely slitting a palm side in the finger tip end, heat sealing a finger tip portion to the finger tip end of the slitted palm side, heat sealing a finger tip portion to the finger tip end of a back side, then heat sealing said front and back sides together providing a formed mitten, and turning the formed mitten inside out.

3. The method of making a heat sealed waterproof mitten from flat vinyl sheeting, the finished mitten having a reversed seam and having palm and back sides each with fingertip regions, at least the palm side having a fingertip blank extending to its fingertip marginal edge, said method comprising the steps of heat sealing the fingertip blank to at least the palm side, then heat sealing the palm side to the back side, said last mentioned seal with said first mentioned seal forming a complete peripheral seal for said fingertip blank and simultaneously providing a formed mitten, and thereafter turning the formed mitten inside out.

References Cited in the file of this patent

UNITED STATES PATENTS

| | | |
|---|---|---|
| 2,446,921 | Grant | Aug. 10, 1948 |
| 2,525,378 | Shmikler | Oct. 10, 1950 |
| 2,737,662 | Winson | Mar. 13, 1956 |
| 2,773,264 | Nover | Dec. 11, 1956 |

OTHER REFERENCES

Article on "An electronic 'sewing machine,'" by C. N. Hoyler, from August 1943 issue of "Electronics"; copy in class 112, Div. 24 (pages 2–7, inclusive).